United States Patent
Yu et al.

(10) Patent No.: US 11,317,105 B2
(45) Date of Patent: Apr. 26, 2022

(54) MODIFICATION OF PICTURE PARAMETER SET (PPS) FOR HEVC EXTENSIONS

(71) Applicant: ARRIS Enterprises LLC, Suwanee, GA (US)

(72) Inventors: Yue Yu, San Diego, CA (US); Limin Wang, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/110,069

(22) Filed: Dec. 2, 2020

(65) Prior Publication Data

US 2021/0120256 A1 Apr. 22, 2021

Related U.S. Application Data

(63) Continuation of application No. 14/533,386, filed on Nov. 5, 2014, now abandoned.

(60) Provisional application No. 61/900,906, filed on Nov. 6, 2013.

(51) Int. Cl.
| | |
|---|---|
| *H04N 19/30* | (2014.01) |
| *H04N 19/70* | (2014.01) |
| *H04N 19/46* | (2014.01) |

(52) U.S. Cl.
CPC ............. *H04N 19/30* (2014.11); *H04N 19/70* (2014.11); *H04N 19/46* (2014.11)

(58) Field of Classification Search
CPC ......... H04N 19/30; H04N 19/70; H04N 19/46
See application file for complete search history.

(56) References Cited

U.S. PATENT DOCUMENTS

2016/0127747 A1* 5/2016 Hsiang ................. H04N 19/567
375/240.29

OTHER PUBLICATIONS

Boyce ("Conditional SPS extension syntax for RExt, SHVC, and MV-HEVC", JVC-VC Meeting; Oct. 23, 2013-Nov. 1, 2013; Geneva; Joint Collaborative Team on Video Coding of SO/IEC JTC1/SC29/WG11 and ITU-T SG. 16) (Year: 2013).*
B.Brass, et al., "High Efficiency Video Coding (HEVC) text specification draft 10", 12th JCT-VC Meeting1. MPEG Meeting; Jan. 23, 2013, 298 pgs. (Year: 2013).*
B. Bross, W.-J. Han, J.-R. Ohm, G. J. Sullivan, Ye-Kui Wang, T. Wiegand, "High Efficiency Video Coding (HEVC) text specification draft 10 (for FDIS & Last Call)," Document of Joint Collaborative Team on Video Coding, JCTVC-L1003_v34, 12th Meeting: Geneva, CH, Jan. 14-23, 2013.

(Continued)

*Primary Examiner* — Maria E Vazquez Colon
(74) *Attorney, Agent, or Firm* — Chernoff, Vilhauer, McClung & Stenzel, LLP

(57) ABSTRACT

A method, apparatus, article of manufacture, and a memory structure for signaling extension functions used in decoding a sequence comprising a plurality of pictures, each picture processed at least in part according to a picture parameter set is disclosed. In one embodiment, the method comprises reading a first extension flag signaling a first extension function in the processing of the sequence and determining if the first extension flag has a first value. Further, the method reads a second extension flag signaling a second extension function in the processing of the sequence and performs the second extension function according to the read second extension flag only if the first extension flag has a first value.

1 Claim, 17 Drawing Sheets

(56) References Cited

OTHER PUBLICATIONS

[2] D. Flynn, J. Soie, T. Suzuki, "High Efficiency Video Coding (HEVC) Range Extensions text specification: Draft 4," JCTVC-N1005_v3, Aug. 2013.

D. Flynn et al. ("High Efficiency Video Coding (HEVC) Range Extensions text specification: Draft 4", Joint Collaborative Team on Video Coding (JCT-VC) of ITU-T SG16 WP3 and ISO/IEC JTC1/SC29/WG11, 13th Meeting: Incheon, KR, Apr. 18, 2013).

Boyce ("Conditional SPS extension syntax for RExt, SHHVC, and MV-HEVC", JVC-VC Meeting; Oct. 23, 2013-Nov. 1, 2013; Geneva; Joint Collaborative Team on Video Coding of SO/IEC JTC1/SC29/WG11 and ITU-T SG. 16).

* cited by examiner

| pic_parameter_set_rbsp( ) { | Descriptor |
|---|---|
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   num_extra_slice_header_bits | u(3) |
|   sign_data_hiding_enabled_flag | u(1) |
|   cabac_init_present_flag | u(1) |
|   num_ref_idx_l0_default_active_minus1 | ue(v) |
|   num_ref_idx_l1_default_active_minus1 | ue(v) |
|   init_qp_minus26 | se(v) |
|   constrained_intra_pred_flag | u(1) |
|   transform_skip_enabled_flag | u(1) |
|   cu_qp_delta_enabled_flag | u(1) |
|   if( cu_qp_delta_enabled_flag ) | |
|     diff_cu_qp_delta_depth | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   transquant_bypass_enabled_flag | u(1) |
|   tiles_enabled_flag | u(1) |
|   entropy_coding_sync_enabled_flag | u(1) |
|   if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |
|         column_width_minus1[ i ] | ue(v) |
|       for( i = 0; i < num_tile_rows_minus1; i++ ) | |
|         row_height_minus1[ i ] | ue(v) |
|     } | |
|     loop_filter_across_tiles_enabled_flag | u(1) |
|   } | |

FIG. 16A

| | | |
|---|---|---|
| pps_loop_filter_across_slices_enabled_flag | | u(1) |
| deblocking_filter_control_present_flag | | u(1) |
| if( deblocking_filter_control_present_flag ) { | | |
|    deblocking_filter_override_enabled_flag | | u(1) |
|    pps_deblocking_filter_disabled_flag | | u(1) |
|    if( !pps_deblocking_filter_disabled_flag ) { | | |
|      pps_beta_offset_div2 | | se(v) |
|      pps_tc_offset_div2 | | se(v) |
|    } | | |
| } | | |
| pps_scaling_list_data_present_flag | | u(1) |
| if( pps_scaling_list_data_present_flag ) | | |
|    scaling_list_data( ) | | |
| lists_modification_present_flag | | u(1) |
| log2_parallel_merge_level_minus2 | | ue(v) |
| slice_segment_header_extension_present_flag | | u(1) |
| 1606 — pps_extension1_flag | | u(1) |
| 1608 — if( pps_extension1_flag ) { | | |
| 1610 —    if( transform_skip_enabled_flag ) | | |
| 1612 —      log2_transform_skip_max_size_minus2 | | ue(v) |
| 1614 —    pps_extension2_flag | | u(1) |
| 1616 — } | | |
| 1618 — if( pps_extension2_flag ) | | |
| 1620 —    while( more_rbsp_data( ) ) | | |
| 1622 —      pps_extension_data_flag | | u(1) |
| rbsp_trailing_bits( ) | | |
| } | | |

FIG. 16B

| | |
|---|---|
| pps_loop_filter_across_slices_enabled_flag | u(1) |
| deblocking_filter_control_present_flag | u(1) |
| if( deblocking_filter_control_present_flag ) { | |
|    deblocking_filter_override_enabled_flag | u(1) |
|    pps_deblocking_filter_disabled_flag | u(1) |
|    if( !pps_deblocking_filter_disabled_flag ) { | |
|      pps_beta_offset_div2 | se(v) |
|      pps_tc_offset_div2 | se(v) |
|    } | |
| } | |
| pps_scaling_list_data_present_flag | u(1) |
| if( pps_scaling_list_data_present_flag ) | |
|    scaling_list_data( ) | |
| lists_modification_present_flag | u(1) |
| log2_parallel_merge_level_minus2 | ue(v) |
| slice_segment_header_extension_present_flag | u(1) |
| pps_extension1_flag | u(1) |
| if( pps_extension1_flag ) { | |
|    if( transform_skip_enabled_flag ) | |
|      log2_transform_skip_max_size_minus2 | ue(v) |
|    pps_extension2_flag | u(1) |
|    if( pps_extension2_flag ) | |
|      while( more_rbsp_data( ) ) | |
|         pps_extension_data_flag | u(1) |
| } | |
| rbsp_trailing_bits( ) | |
| } | |

FIG. 16C

MODIFICATION OF PICTURE PARAMETER SET (PPS) FOR HEVC EXTENSIONS

CROSS-REFERENCE TO RELATED APPLICATIONS

This application is a continuation of U.S. patent application Ser. No. 14/533,386, filed Nov. 5, 2014, which claims benefit of the following U.S. Provisional Patent Application, which is hereby incorporated by reference: Application Ser. No. 61/900,906, entitled "THE MODIFICATION OF PICTURE PARAMETER SET (PPS) FOR HEVC RANGE EXTENSION," by Yue Yu and Limin Wang, filed Nov. 6, 2013.

BACKGROUND OF THE INVENTION

1. Field of the Invention

The present invention relates to systems and methods for encoding data, and in particular to a system and method for generating and processing slice headers with high efficiency video coded data.

2. Description of the Related Art

There is rapid growth in the technologies associated with the generation, transmission, and reproduction of media programs. These technologies include coding schemes that permit digital versions of the media programs to be encoded to compress them to much smaller size and facilitate their transmission, storage, reception, and playback. These technologies have application in personal video recorders (PVRs), video on demand (VOD), multiple channel media program offerings, interactivity, mobile telephony, and media program transmission.

Without compression, digital media programs are typically too large to transmit and/or store for a commercially acceptable cost. However, compression of such programs has made the transmission and storage of such digital media programs not only commercially feasible, but commonplace.

Initially, the transmission of media programs involved low to medium resolution images transmitted over high bandwidth transmission media such as cable television and satellite. However, such transmission has evolved to include lower bandwidth transmission media such as Internet transmission to fixed and mobile devices via computer networks, WiFi, Mobile TV and third and fourth generation (3G and 4G) networks. Further, such transmissions have also evolved to include high definition media programs such as high definition television (HDTV), which have significant transmission bandwidth and storage requirements.

The High Efficiency Video Coding (HEVC) coding standard (or H.265) is the most recent coding standard promulgated by the ISO/IEC MPEG standardization organizations. The coding standard preceding HEVC included the H.262/MPEG-2 and the subsequent H.264/MPEG-4 Advanced Video Coding (AVC) standard. H.264/MPEG-4 has substantially replaced H.262/MPEG-2 in many applications including high definition (HD) television. HEVC supports resolutions higher than HD, even in stereo or multi-view embodiments, and is more suitable for mobile devices such as tablet personal computers. Further information regarding HEVC can be found in the publication "Overview of the High Efficiency Video Coding (HEVC) Standard, by Gary J. Sullivan, Jens-Rainer Ohm, Woo Jin Han and Thomas Wiegand, IEEE Transactions on Circuits and Systems for Video Technology, December 2012, which is hereby incorporated by reference herein.

As in other coding standards, the bitstream structure and syntax of HEVC compliant data are standardized, such that every decoder conforming to the standard will produce the same output when provided with the same input. Some of the features incorporated into the HEVC standard include the definition and processing of a slice, one or more of which may together comprise one of the pictures in a video sequence. A video sequence comprises a plurality of pictures, and each picture may comprise one or more slices. Slices include non-dependent slices and dependent slices. A non-dependent slice (hereinafter simply referred to as a slice) is a data structure that can be decoded independently from other slices of the same picture in terms of entropy encoding, signal prediction, and residual signal construction. This data structure permits resynchronization of events in case of data losses. A "dependent slice" is a structure that permits information about the slice (such as those related with tiles within the slice or wavefront entries) to be carried to the network layer, thus making that data available to a system to more quickly process fragmented slices. Dependent slices are mostly useful for low-delay encoding.

HEVC and legacy coding standards define a parameter set structure that offers improved flexibility for operation over a wide variety of applications and network environments, and improved robustness to data losses. Parameter sets contain information that can be shared for decoding of different portions of the encoded video. The parameter set structure provides a secure mechanism for conveying data that is essential to the decoding process. H.264 defined both sequence parameter sets (SPS) that describe parameters for decoding a sequence of pictures and a picture parameter set (PPS) that describes parameters for decoding a picture of the sequence of pictures. HEVC introduces a new parameter set, the video parameter set (VPS).

The encoding and decoding of slices is performed according to information included in a slice header. The slice header includes syntax and logic for reading flags and data that are used in decoding the slice.

Like its predecessors, HEVC supports both temporal and spatial encoding of picture slices. HEVC defines slices to include I-slices, which are spatially, but not temporally encoded with reference to another slice. I-slices are alternatively described as "intra" slice encoded. HEVC also defines slices to include P (predictive) slices, which are spatially encoded and temporally encoded with reference to another slice. P-slices are alternatively described as "inter" slice encoded. HEVC also describes slices to include bi-predictive (B)-slices. B-slices are spatially encoded and temporally encoded with reference to two or more other slices. Further, HEVC consolidates the notion of P and B slices into general B slices that can be used as reference slice.

Currently, the HEVC syntax includes provision for extensions to expand the capabilities or capacities of HEVC beyond the baseline. Such extensions include range extensions (RExt, scalability extensions (SHVC), and multi-view extensions (MV-HEVC). Extensions may be signaled in the VPS, SPS, PPS, or combination thereof.

Currently, the PPS syntax, defines both range and multi-layer extensions, as described in paragraphs 7.3.2.2.2 and 7.3.2.2.3 of "Draft high efficiency video coding (HEVC) version 2, combined format range extensions (RExt), scalability (SHVC), and multi-view (MV-HEVC) extensions," Draft ISO/IEC 23008-2:201x(E) JCTVC-R1013_v6, published by the Joint Collaborative Team on Video Coding (JCT-VC), on Jun. 30, 2014 by Jill Boyce et al., which is hereby incorporated by reference herein. However, this standard provides for the handling of extension flags and extensions that are functionally independent from one another (e.g. the presence of a particular extension does not make the presence of another particular extension more probable, and hence, are evaluated in order, one at a time, without regard to the notion that the absence of one extension necessarily implicates that another extension is not present or implicated. While this standard is adequate for cases where the extensions are truly independent, it can result in wasted operations and instructions when the extensions are not. Accordingly, there is a need for a PPS syntax that efficiently provides for extensions that are not independent. This disclosure presents a description of a PPS syntax that satisfies this need.

SUMMARY

To address the requirements described above, this document discloses a memory structure for signaling extension functions used in decoding a sequence comprising a plurality of pictures, each picture processed at least in part according to a picture parameter set is disclosed. In one embodiment, the method comprises reading a first extension flag signaling a first extension function in the processing of the sequence and determining if the first extension flag has a first value. Further, the method reads a second extension flag signaling a second extension function in the processing of the sequence and performs the second extension function according to the read second extension flag only if the first extension flag has a first value. Another embodiment is disclosed in which an apparatus is evidenced by a processor having a communicatively coupled memory storing instructions for performing the foregoing operations.

BRIEF DESCRIPTION OF THE DRAWINGS

Referring now to the drawings in which like reference numbers represent corresponding parts throughout:

FIGS. 16A and 16B are diagrams presenting a baseline PPS syntax;

FIGS. 16C and 16D are diagrams presenting an improved PPS syntax;

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Audio-Visual Information Transception and Storage

Figure 1:
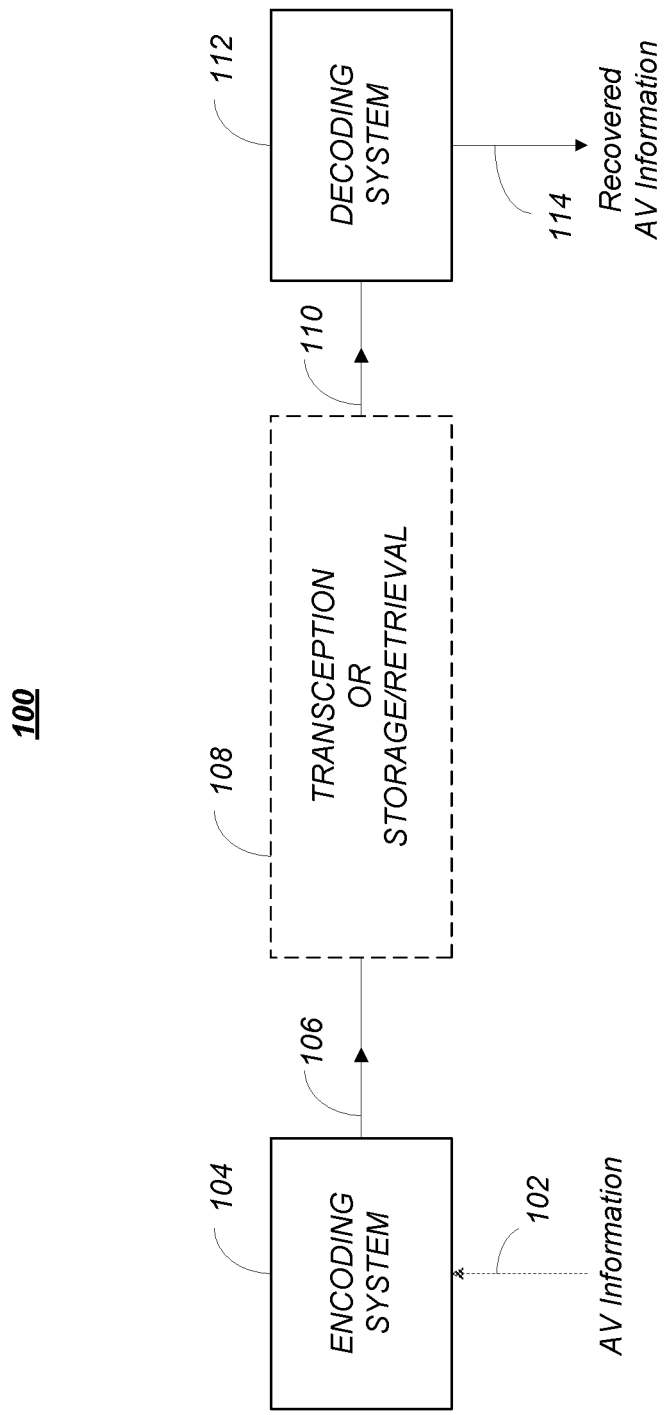
FIG. 1 is a diagram depicting an exemplary embodiment of a video coding-decoding system that can be used for transmission and/or storage and retrieval of audio and/or video information.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2A:
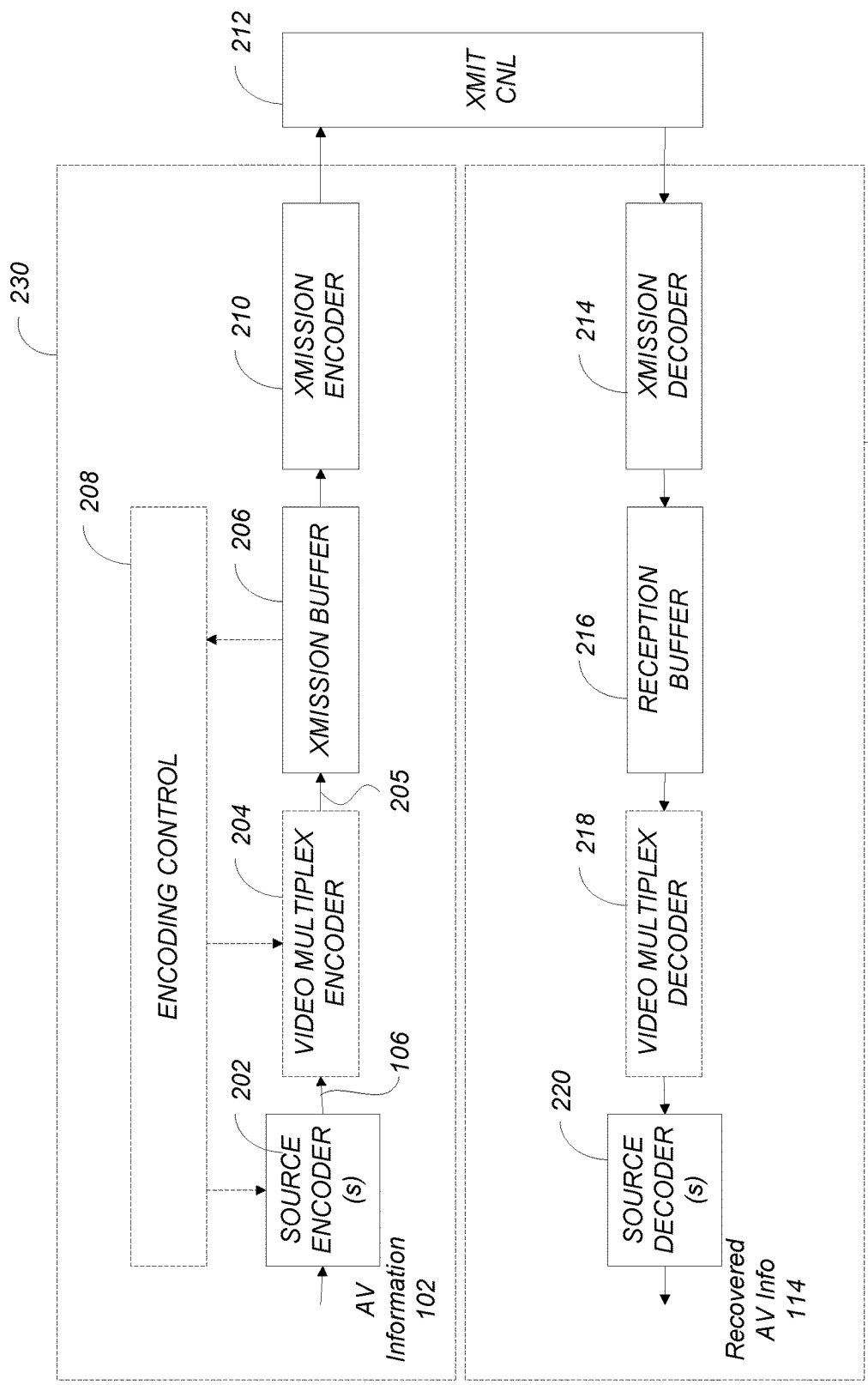
FIG. 2A is a diagram of one embodiment of a codec system in which the encoded AV information is transmitted to and received at another location.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal and converts the received signal into the recovered AV information 114 for presentation. As described above, due to coding and transmission losses and errors, the recovered AV information 114 may be of lower quality than the AV information 102 that was provided to the transmission segment 230. However, error-correcting systems may be included to reduce or eliminate such errors. For example, the encoded AV information 106 may be forward error correction (FEC) encoded by adding redundant information, and such redundant information can be used to identify and eliminate errors in the reception segment 230.

The transmission segment 102 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 106 according to certain performance parameters that affect the instantaneous bit rate, the signals from each of the source encoders 106 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by a coding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 114 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission coder 210 using a decoding scheme complementary to the coding scheme used in the transmission encoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex coder 204. Finally, the video signal of interest is decoded by source decoder 220 using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as WiFi, an Ethernet network, an Internet network or a mixed network composed of several different networks. Such communication may be affected via a communication protocol, for example Real-time Transport Protocol (RIP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The client 232 decodes the received and reconstructed data stream and reproduces the video images on a display device and the audio data by a loud speaker.

Figure 2B:
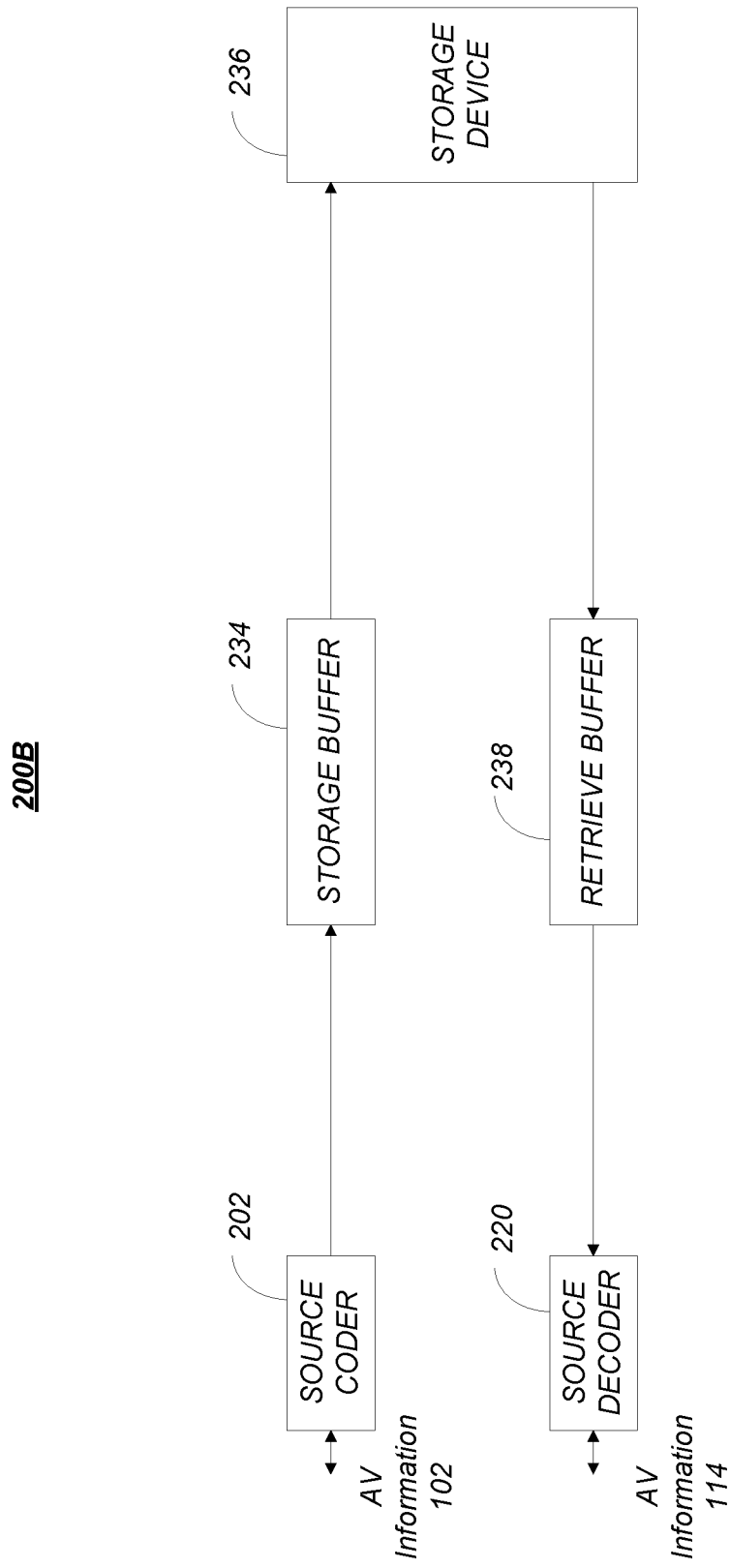
FIGS. 2B-2C provide diagrams depicting embodiments of codec systems.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
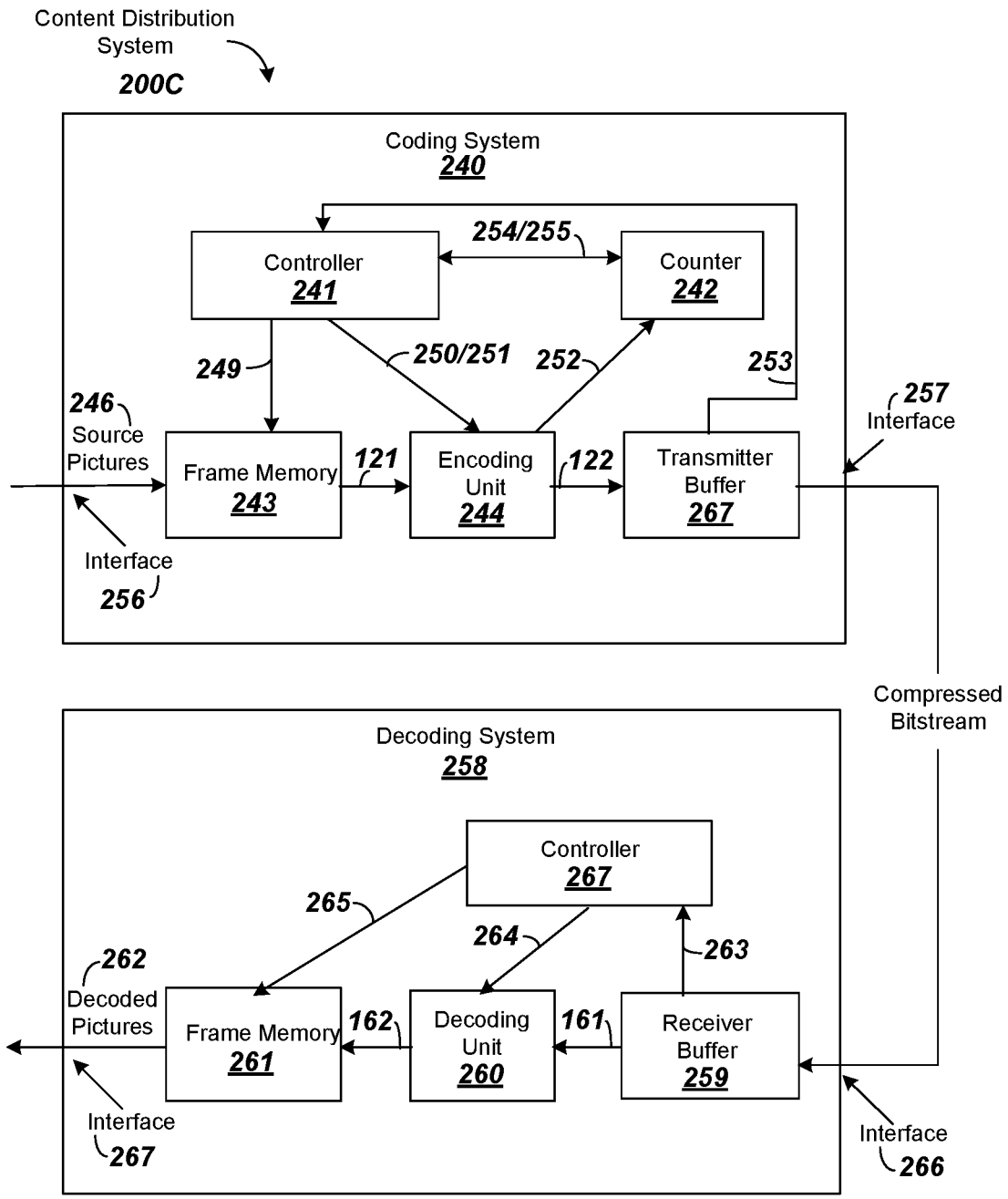

FIG. 2C is another diagram depicting an exemplary content distribution system 200C comprising a coding system or encoder 202 and a decoding system or decoder 220 that can be used to transmit and receive HEVC data. In some embodiments, the coding system 202 can comprise an input interface 256, a controller 241 a counter 242 a frame memory 243, an encoding unit 244, a transmitter buffer 267 and an output interface 257. The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 267 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures utilizing the controller 241. The frame memory 243 can have a first area that can be used for storing the incoming frames from the source pictures 246 and a second area that can be used for reading out the frames and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 202 to start an encoding operation, such as preparing the Coding Units based on a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 267.

The encoded video signal 248, including the generated video compression data, can be stored in the transmitter buffer 267. The information amount counter 242 can be incremented to indicate the total amount of data in the transmitter buffer 267. As data is retrieved and removed from the buffer, the counter 242 can be decremented to reflect the amount of data in the transmitter buffer 267. The occupied area information signal 253 can be transmitted to the counter 242 to indicate whether data from the encoding unit 244 has been added or removed from the transmitter buffer 267 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 267.

The information amount counter 242 can be reset in response to a preset signal 254 generated and output by the controller 241. After the information amount counter 242 is reset, it can count data output by the encoding unit 244 and obtain the amount of video compression data and/or video packets, which have been generated. The information amount counter 242 can supply the controller 241 with an information amount signal 255 representative of the obtained amount of information. The controller 241 can control the encoding unit 244 so that there is no overflow at the transmitter buffer 267.

In some embodiments, the decoding system 220 can comprise an input interface 266, a receiver buffer 259, a controller 267, a frame memory 261, a decoding unit 260 and an output interface 267. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 220. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 263 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 269 into the frame memory 261. The frame memory 261 can have a first area into which the decoded video signal is written, and a second area used for reading out decoded pictures 262 to the output interface 267.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Prior art encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below.

Figure 3:
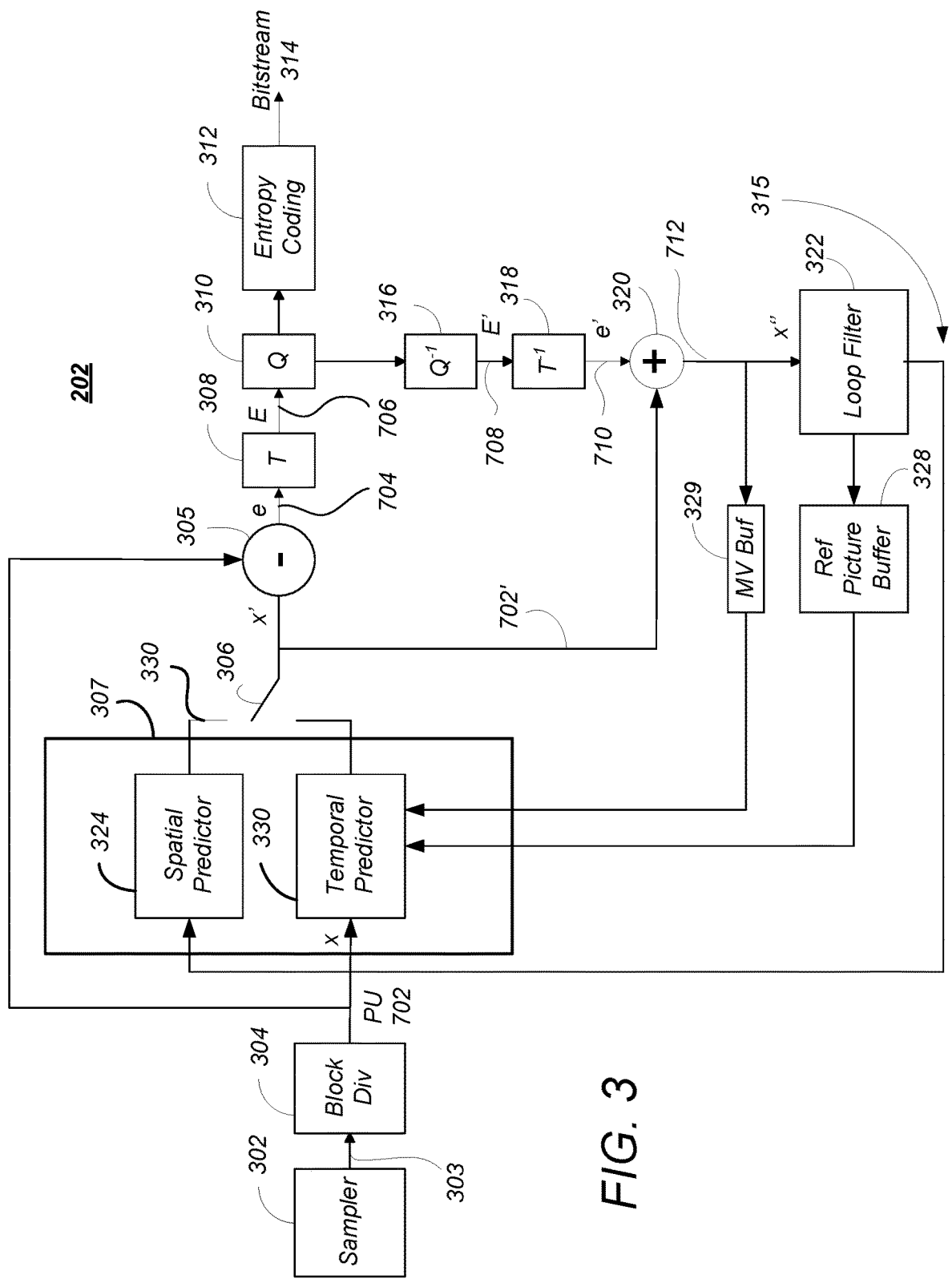
FIG. 3 is a block diagram illustrating one embodiment of the source encoder.

FIG. 3 is a block diagram illustrating one embodiment of the source encoder 202. The source encoder 202 accepts AV information 102 and uses sampler 302 sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces an uncompressed picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks 102, for example 4×4, 4×8, 8×4, 8×8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs) and are further described below.

Figure 4:
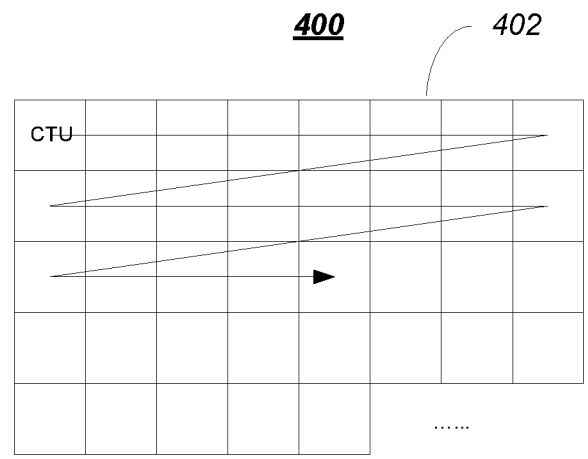
FIG. 4 is a diagram depicting a picture of AV information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units (s), or CTUs 402. Unlike H.264 and previous video coding standards where the basic coding unit is macroblock of 16×16 pixels, the CTU 402 is the basic coding unit of HEVC and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units described by a "quadtree" decomposition further described below. Coding units are regions formed in the image to which similar encoding parameters are applied and transmitted in the bitstream 314.

Figure 5:
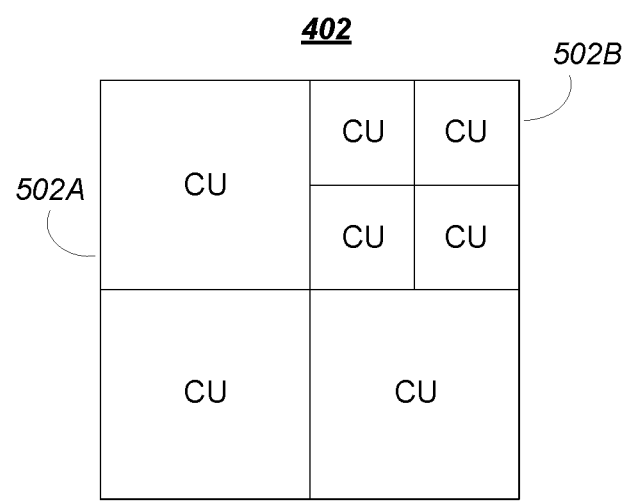
FIG. 5 is a diagram showing an exemplary partition of a coding tree block into coding units.

FIG. 5 is a diagram showing an exemplary partition of an CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
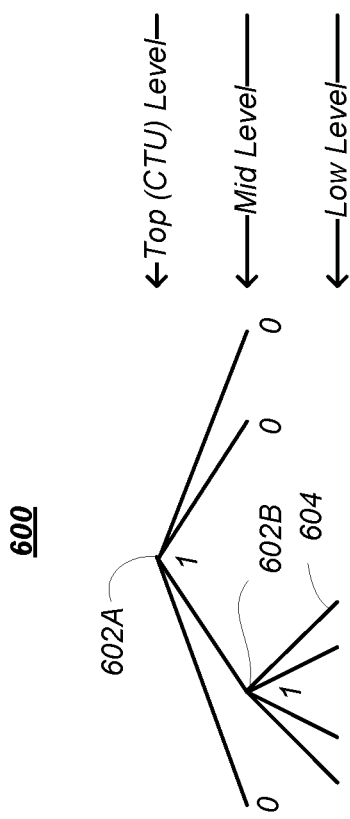
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5 can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and a transform units (TUs), both of which have a maximum size equal to the size of the corresponding CU 502.

Figure 7:
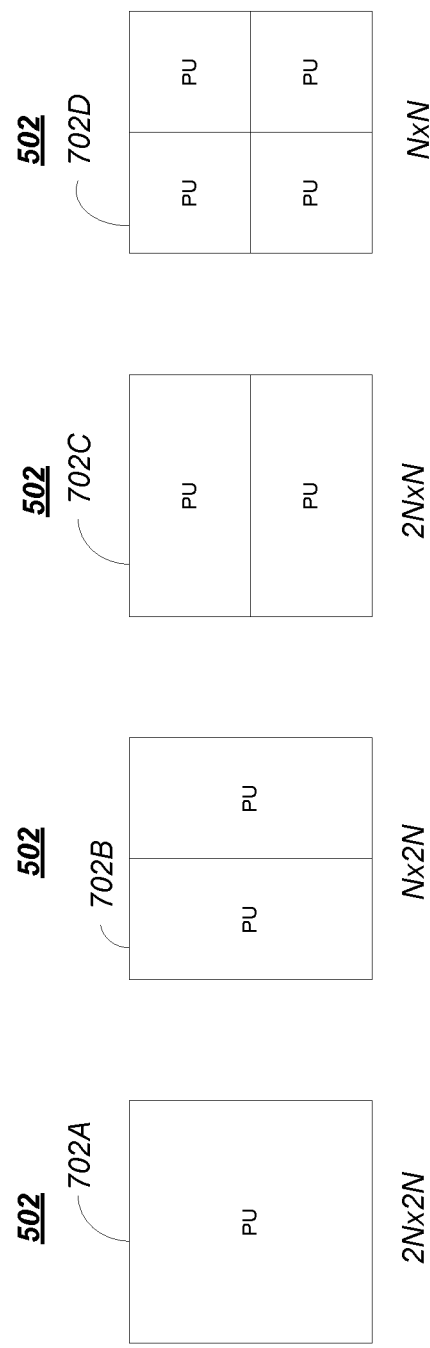
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types. PUs 702 are an extension of the partitioning of H.264/AVC for motion estimation and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D)), as shown in FIG. 7.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
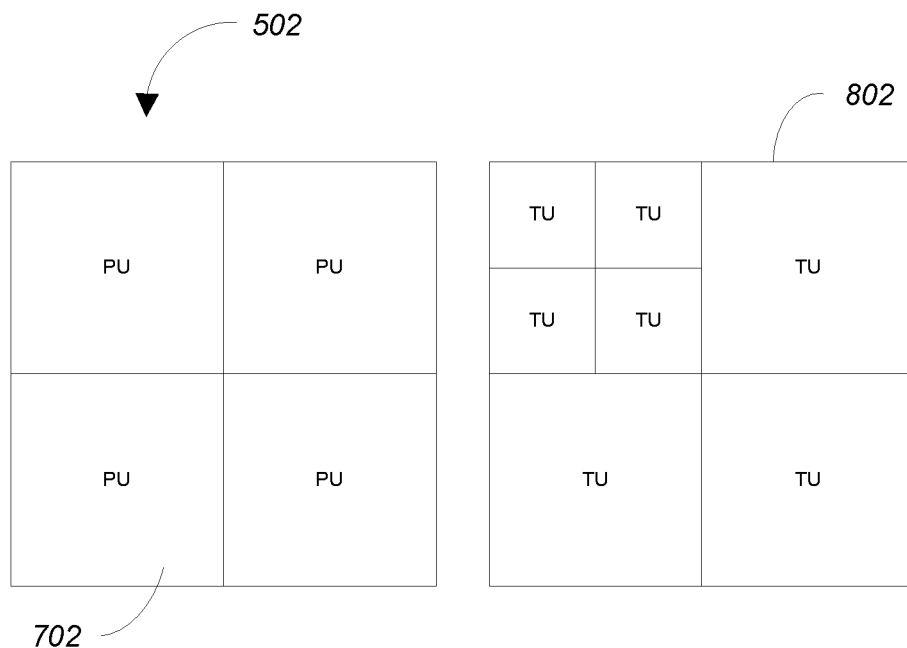
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a DCT (Discrete Cosine Transform). The size and location of each block transform TU 802 within a CU 502 is described by a "residual" quadtree (RQT) further illustrated below.

Figure 9:
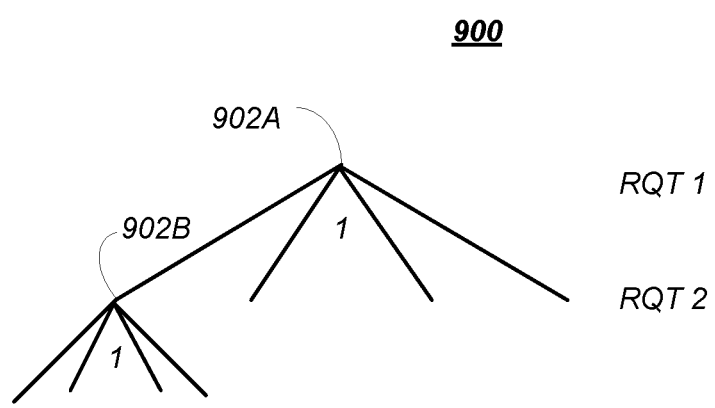
FIG. 9 is a diagram showing RQT codetree for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS) and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
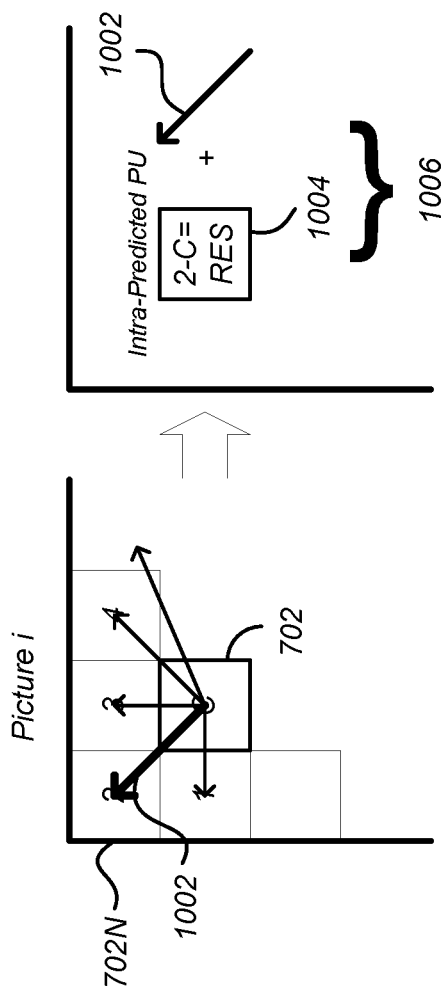
FIG. 10 is a diagram illustrating spatial prediction of prediction units.

FIG. 10 is a diagram illustrating spatial prediction of PUs 702. A picture may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3 or 4 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 (*e*) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
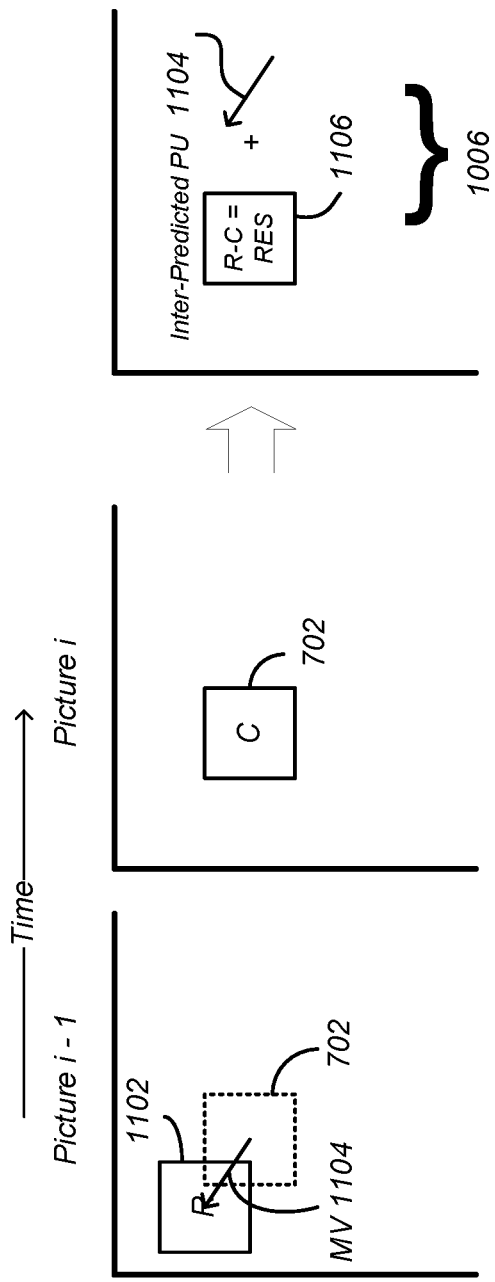
FIG. 11 is a diagram illustrating temporal prediction.

FIG. 11 is a diagram illustrating temporal prediction. Temporal prediction considers information from temporally neighboring pictures or frames, such as the previous picture, picture i-1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that is defines the displacement between the current PU 702 in current frame (picture i) and the reference area 1102 (refIdx) in the reference frame (picture i-1). A PU in a B-picture may have up to two MVs. Both MV and refIdx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1106. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
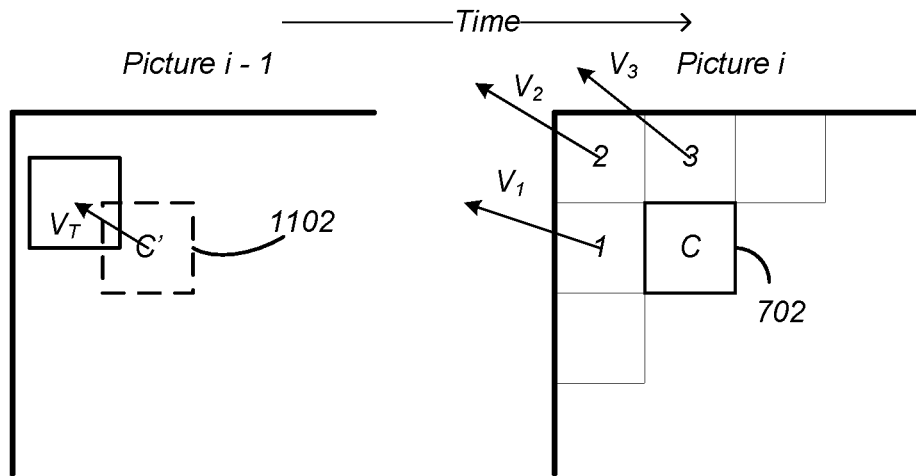
FIG. 12 is a diagram illustrating the use of motion vector predictors (MVPs)

FIG. 12 is a diagram illustrating the use of motion vector predictors (MVPs) in HEVC. Motion vector predictors $V_1$, $V_2$ and $V_3$ are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor $V_T$ which is the motion vector of the co-located block C' in a previously decoded picture (in decoding order) of the sequence (e.g. block of picture i-1 located at the same spatial position as the block being coded (block C of image i).

The components of the spatial motion vector predictors $V_1$, $V_2$ and $V_3$ and the temporal motion vector predictor $V_T$ can be used to generate a median motion vector predictor $V_M$. In HEVC, the three spatial motion vector predictors may be taken as shown in FIG. 12, that is, from the block situated to the left of the block to encode ($V_1$), the block situated above ($V_3$) and from one of the blocks situated at the respective corners of the block to encode ($V_2$), according to a predetermined rule of availability. This MV predictor selection technique is known as Advanced Motion Vector Prediction (AMVP).

A plurality of (typically five) MV predictor (MVP) candidates having spatial predictors (e.g. $V_1$, $V_2$ and $V_3$) and temporal predictor(s) $V_T$ is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor and are later used by the decoder to recover the motion vector. These bits or flags are further described below.

Referring back to FIG. 3, the intra-predicted residuals 1004 and the inter-predicted residuals 1106 obtained from the spatial (intra) or temporal (inter) prediction process are then transformed by transform module 308 into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 310 as a part of the useful data coding the images of the AV information. Coding syntax elements may also be coded using spatial dependencies between syntax elements to increase the coding efficiency. HEVC offers context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E) 708. The dequantized data 708 is then provided to inverse transformer 318 which applies the inverse of the transform applied by the transform module 308 to generate reconstructed residual coefficients of the PU (e) 710.

The reconstructed coefficients of the residual PU 710 are then added to the corresponding coefficients of the corresponding predicted PU (x) 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream typically a picture or slice header.

The filtered images, also known as reconstructed images, are then stored as reference images from reference image buffer 328 in order to allow the subsequent "Inter" predictions taking place during the compression of the subsequent images of the current video sequence.

Reference Image Syntax

As described above, to reduce errors and improve compression, HEVC permits the use of several reference images for the estimation and motion compensation of the current image. Given a current PU 702 in a current picture, the collocated PU 1102 for a particular slice resides in associated nearby reference/non-reference picture. For example, in FIG. 12, the collocated PU 1102 for current PU 702 in picture (i) resides in the associated nearby reference picture (i-1). The best "inter" or temporal predictors of the current PU 702 are selected in some of the multiple reference/non-reference images, which may be based on pictures temporally prior to or after the current picture in display order (backwards and forward prediction, respectively).

For HEVC, the index to reference pictures is defined by reference picture lists that are described in the slice syntax. Forward prediction is defined by list_0 (RefPicList0), and backward prediction is defined by list_1 (RefPicList1), and both list 0 and list 1 can contain multiple reference pictures prior to or/and later than the current picture in the display order.

Figure 13:
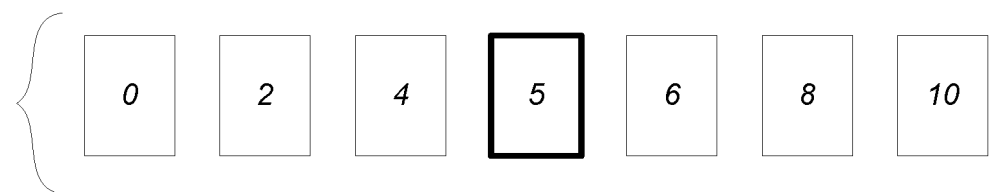
FIG. 13 illustrates an example of the use of the reference picture lists.

FIG. 13 illustrates an example of the use of the reference picture lists. Consider pictures 0, 2, 4, 5, 6, 8 and 10 shown in FIG. 13, wherein the numbers of each picture denote display order and the current picture is picture 5. In this case, the list_0 reference pictures with ascending reference picture indices and starting with index equal to zero are 4, 2, 0, 6, 8 and 10, and the list_1 reference pictures with ascending reference picture indices and starting with index equal to zero are 6, 8, 10, 4, 2, and 0. A slice that the motion compensated prediction is restricted to the list_0 prediction is called a predictive or P-slice. Collocated pictures are indicated by using the collocated_ref_idx index in the HEVC. A slice for which the motion-compensated prediction includes more than one reference picture is a bi-predictive or B-slice. For B-slices, the motion compensated prediction may include reference pictures from list_1 prediction as well as list_0.

Hence, a collocated PU 1102 is disposed in a reference picture specified in either list_0 or list1. A flag (collocated_from_10_flag) is used to specify whether the collocated partition should be derived from list_0 or list_1 for a particular slice type. Each of the reference pictures is also associated with a motion vector.

The storage and retrieval of reference pictures and related motion vectors for the emerging HEVC standard is expressed in paragraph 8.4.1.2.9 of Benjamin Bross, Woo Jin Han, Jens-Rainer Ohm, Gary J. Sullivan, Thomas Wiegand, "WD4: Working Draft 4 of High-Efficiency Video Coding," Joint Collaborative Team on Video Coding (JCT-VC) of ITU-T SG16 WP3 and ISO/IEC JTC1/SC29/WG11, JCTVC-F803_d5, 6th Meeting: Torino, IT, 14-22 Jul., 2011 (hereby incorporated by reference herein).

According to the standard, if the slice_type is equal to B and the collocated_from_10_flag is 0, the collocated_ref idx variable specifies the reference picture as the picture that contains the co-located partition as specified by RefPicList1. Otherwise (slice_type is equal to B and collocated_from_10_flag is equal to 1 or slice_type is equal to P), the collocated_ref idx variable specifies the reference picture as the picture that contains the collocated partition as specified by RefPicList0.

Figure 14:
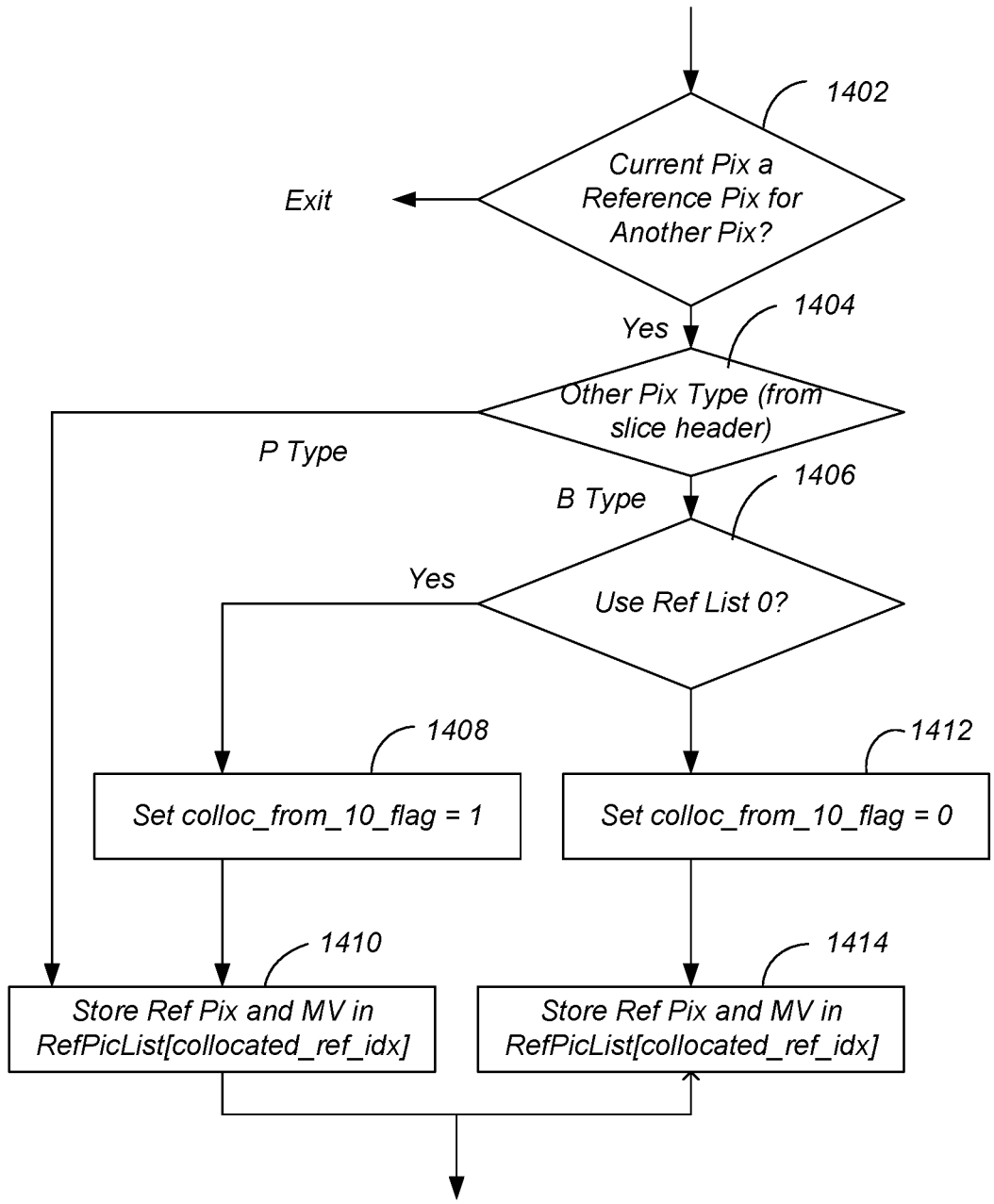
FIG. 14 is a diagram illustrating processes performed by the encoder according to the aforementioned standard.

FIG. 14 is a diagram illustrating processes performed by the encoder 202 according to the aforementioned standard. Block 1402 determines whether the current picture is a reference picture for another picture. If not, there is no need to store reference picture or motion vector information. If the current picture is a reference picture for another picture, block 1504 determines whether the "another" picture is a P-type or a B-type picture. If the picture is a P-type picture, processing is passed to blocks 1410, which set the colloc_from_10_flag to one and store the reference picture and motion vector in list 0. If the "another picture" is a B-type picture, block 1406 nonetheless directs processing to blocks 1408 and 1410 if the desired reference picture is to be stored in list 0, and to blocks 1412 and 1414 if the desired reference picture and motion vector is to be stored in list 1. This decision may be based on whether it is desirable to select reference pictures from a temporally preceding or succeeding picture. Which of the multiple possible reference pictures is selected is determined according to the collocated_ref_idx index.

Figure 15:
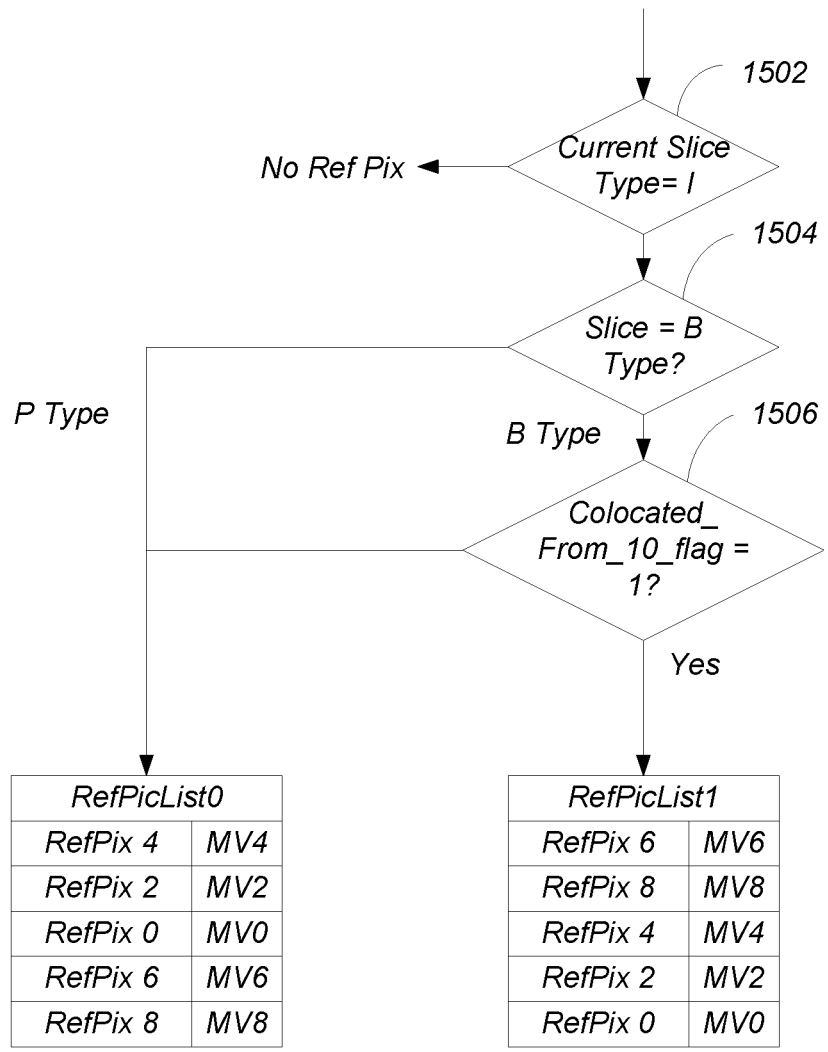
FIG. 15 depicts the use of a the collocated_from_10_flag by the decoder in decoding a according to the emerging HEVC standard.

FIG. 15 depicts the use of a collocated_from_10_flag by the decoder 220 in decoding a according to the previous HEVC standard. Block 1502 determines if the current slice type being computed is an intra or I-type. Such slices do not use temporally nearby slices in the encoding/decoding process, and hence there is no need to find a temporally nearby reference picture. If the slice type is not I-type, block 1504 determines whether the slice is a B-slice. If the slice is not a B-type, it is a P-type slice, and the reference picture that contains the collocated partition is found in list 0, according to the value of collocated_ref idx. If the slice is B-type, the collocated_from_10_flag determines whether the reference picture is found in list 0 or list 1. As the index indicates, the collocated picture is therefore defined as the reference picture having the indicated collocated_ref_idx in either list 0 or list 1, depending on the slice type (B-type or P-type) and the value of the collocated_from_10_flag. In one embodiment of HEVC, the first reference picture (the reference picture having index [0] as shown in FIG. 13 is selected as the collocated picture).

Baseline Picture Parameter Set Syntax

FIGS. 16A and 16B are diagrams presenting a baseline PPS Raw Byte Sequence Payload (RBSP) syntax. Syntax for dealing with extensions in the PPS are shown in FIG. 16B.

Logic 1602 determines if the media is to be coded/decoded including a first extension and reads the appropriate signaling and data. Logic 1602 comprises statements 1606-1616. Statement 1606 reads a pps_extensional_flag, which indicates whether the first extension has been selected for the coding/decoding process. In one embodiment, a logical value of "1" indicates that the media is to be processed using the first extension, and a logical value of "0" indicates that the media is not to be processed using the first extension. Statement 1608 is a conditional statement that directs execution of statements 1612-1614 depending upon the value of a (previously read) transform_skip_enabled_flag. In particular, the illustrated logic performs the operations shown in statements 1612-1614 if the transform_skip_enabled_flag is a logical "1" or true.

Transform skipping is an extension that allows the DCT transform of a TU to be skipped under certain circumstances. Essentially, the DCT transform has the property that for media with highly correlated signals, it results in outstanding energy compaction. However, for media with highly uncorrelated signals (e.g. media having a large amount of detail), the compaction performance is much less. For some media, the DCT transform process has so little compaction performance, the process is better skipped for better processing performance. The transform_skip_enabled_flag indicates when skipping the DCT transform of a TU is permitted. This is described, for example, in "Early Termination of Transform Skip Mode for High Efficiency Video Coding," by Do Kyung Lee, Miso Park, Hyung-Do Kim and Je-Chang Jeong in the Proceedings of the 2014 International Conference on Communications, Signal Processing and Computers, which is hereby incorporated by reference. If the transform_skip_enabled flag is a logical 1 (true), processing is routed to statement 1612 and 1614. Otherwise, processing is routed to statement 1618. Statement 1612 performs the operation of reading a value log 2_transform_skip_max_size_minus2, which indicates the maximum TU size that may be skipped (if the transform_skip_enabled_flag indicates that performing the DCT transform of the TU is permitted). Statement 1614 performs the operation of reading a flag pps_extension2_flag indicating if a further extension (extension2) is implemented.

Next, logic 1604 is performed. Logic 1604 includes statements 1618-1622. Statement 1618 is a conditional statement that routes processing to the logic of statements 1620 and 1622 if the pps_extension2_flag is a logical 1. Statements 1620 and 1622 read additional pps_extension_data_flags while RBSP data exists.

In the foregoing PPS design of HEVC range extension, the pps_extension2_flag accounts for as yet unidentified extension data. According to the logic described above, if pps_extension1_flag is true, pps_extension2_flag is present. If pps_extension1_flag is not true, pps_extension2_flag is not present. If pps_extension2_flag is not present, pps_extension2_flag is inferred to be equal to 0. If pps_extension2_flag is 0, there is no additional extension data.

This logical formulation always checks the value of pps_extension2_flag for possible additional extension syntax regardless of the status of pps_extension1_flag. However, if pps_extension1_flag is 0, there is no need to check pps_extension2_flag, because if pps_extension1_flag is 0, pps_extension2_flag will not be present, and if pps_extension2_flag is not present, it will inferred to be equal to 0, which indicates that there is no further extension data.

FIG. 16C presents a modified PPS Raw Byte Sequence Payload (RBSP) syntax. Logic 1602' is modified from logic 1602 and includes statements 1606-1622. As before, statement 1606 implements logic reading the pps_extension1_flag. Statement 1608 is a conditional statement that commands the processing of logic associated with statements 1610-1622 if the pps_extension1_flag is a logical 1 or true, and otherwise skips these statements.

Statement 1610 is a conditional statement that commands the operations of statements 1612-1614 be performed only if the transform_skip_enabled_flag (described above) is a logical 1. Those statements include, as before, a statement to read the value of the log 2_transform_skip_max_size_minus_2, and the pps_extension flag, as shown in statements 1612 and 1614. However, logic 1604 (statements 1616-1620) of FIG. 16B is now incorporated within the conditional statement 1608 and is executed only if pps_extension1_flag tests to a logical 1. This allows the logic of statements 1610-1620 to be skipped if pps_extension1_flag tests to a logical 0, thus saving execution time. While the foregoing is illustrated with respect to a second extension to read additional data that is only implicated if a first extension related to transform skipping tests true, the first extension and second extension may be any extensions that are non-independent (e.g. one of the extension functions or operations are only implicated depending on the status of another of the extension functions or operations.

Figure 16D:
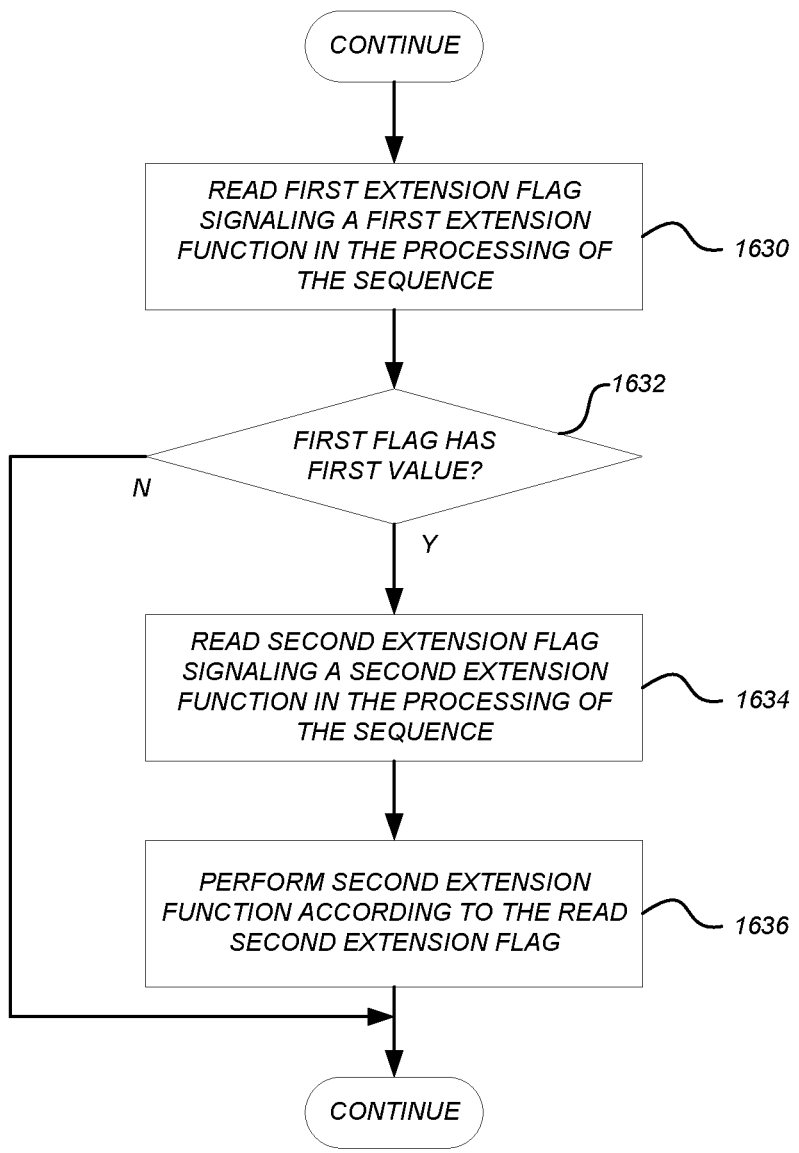

FIG. 16D is a flow chart illustrating exemplary operations for decoding a sequence comprising a plurality of pictures that are processed at least in part according to a picture parameter set. In block 1630, a first extension flag (for example, the pps_extension1_flag) that signals a first extension function is to be performed in the processing of the sequence or the picture is read. In block 1632, a determination is made as to whether the read first flag has a first value, and if the flag does not have a first value, processing is routed around the logic of blocks 1634 and 1636. In the embodiment illustrated in FIG. 16C, this is analogous to logic of statement 1608 and 1622. Only if the read first flag has the first value, processing is passed to block 1634, which reads a second extension flag that signals a second extension function in the processing of the sequence or picture, and block 1636 performs the second extension function according to the read second extension flag. This is analogous to the logic of blocks 1614-1620.

In one embodiment, the first extension function is performed according to the first extension flag after reading the first extension flag and before reading the second extension flag. For example, with respect to FIG. 16C, the log 2_transform_skip_max_size_minus2 value is read if the pps_extension1_flag tests true before reading the pps_extension2_flag. IN this case, the processed picture comprises a plurality of TUs, and the processing sequence comprises DCT transforming at least some of the TUs of the associated processed picture, and skipping the DCT transforming process of other of the plurality of transform units under certain circumstances, for example, if the TU is greater in size than a maximum TU size (e.g. 4×4). In this case, the first extension function comprises reading a value indicating the maximum permitted size of the TU for which DCT transforming may be skipped.

As described above, the first extension function and the second extension function may be functionally related. For example, the second extension function may require receiving a result of the first extension function, before the second extension function may be completed. Or, the second extension function may be mutually exclusive from the first extension function (e.g. either the first extension function or the second extension function are to be performed, but not both). Or, the second extension function may be a function that would not be performed unless the first extension function is also performed, hence the second extension function is only implicated or performed in the processing sequence if the first extension function is also performed. For example, a computation may require an output or result from both the first extension function and the second extension function, and hence, existence of the first extension function necessarily implicates the second extension function and vice-versa.

The foregoing operations are described with respect to a decoding process, which can take place in either a the source decoder 220 or an encoder 202, as a part of the encoding process. The encoding process may also be expressed as comprising determining if a slice of the one or more slices is an inter-predicted slice according to slice type data, and if the slice is an inter-predicted slice, configuring a first parameter in the slice header associated with the slice to a value signaling enablement of a state of weighted prediction of image data associated with the slice.

Hardware Environment

Figure 17:
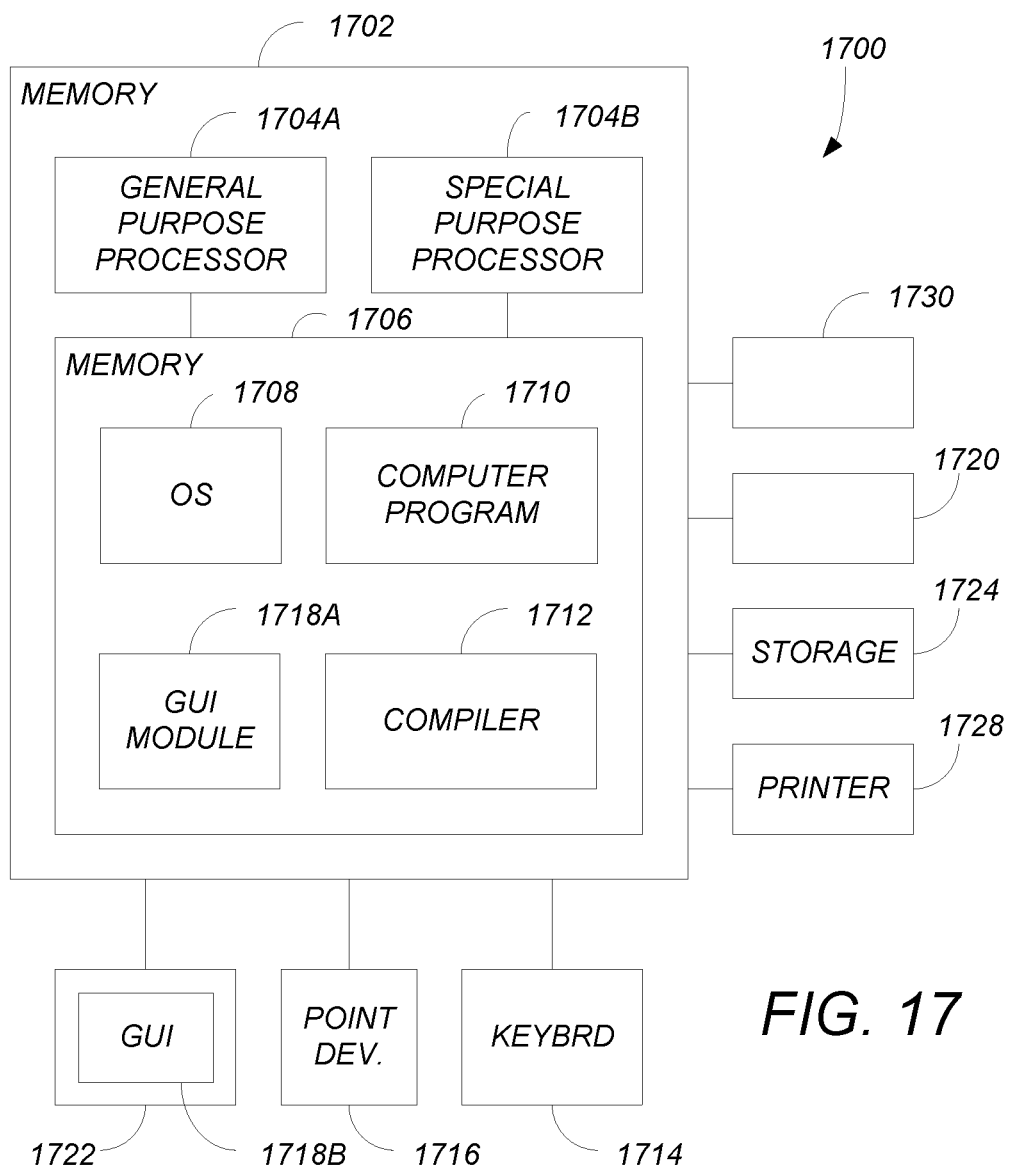
FIG. 17 illustrates an exemplary processing system that could be used to implement the embodiments of the invention.

FIG. 17 illustrates an exemplary processing system 1700 that could be used to implement the embodiments of the invention. The computer 1702 comprises a processor 1704 and a memory, such as random access memory (RAM) 1706. The computer 1702 is operatively coupled to a display 1722, which presents images such as windows to the user on a graphical user interface 1718B. The computer 1702 may be coupled to other devices, such as a keyboard 1714, a mouse device 1716, a printer, etc. Of course, those skilled in the art will recognize that any combination of the above components, or any number of different components, peripherals, and other devices, may be used with the computer 1702.

Generally, the computer 1702 operates under control of an operating system 1708 stored in the memory 1706, and interfaces with the user to accept inputs and commands and to present results through a graphical user interface (GUI) module 1718A. Although the GUI module 1718A is depicted as a separate module, the instructions performing the GUI functions can be resident or distributed in the operating system 1708, the computer program 1710, or implemented with special purpose memory and processors. The computer 1702 also implements a compiler 1712 which allows an application program 1710 written in a programming language such as COBOL, C++, FORTRAN, or other language to be translated into processor 1704 readable code. After completion, the application 1710 accesses and manipulates data stored in the memory 1706 of the computer 1702 using the relationships and logic that was generated using the compiler 1712. The computer 1702 also optionally comprises an external communication device such as a modem, satellite link, Ethernet card, or other device for communicating with other computers.

In one embodiment, instructions implementing the operating system 1708, the computer program 1710, and the compiler 1712 are tangibly embodied in a computer-readable medium, e.g., data storage device 1720, which could include one or more fixed or removable data storage devices, such as a zip drive, floppy disc drive 1724, hard drive, CD-ROM drive, tape drive, etc. Further, the operating system 1708 and the computer program 1710 are comprised of instructions which, when read and executed by the computer 1702, causes the computer 1702 to perform the steps necessary to implement and/or use the invention. Computer program 1710 and/or operating instructions may also be tangibly embodied in memory 1706 and/or data communications devices 1730, thereby making a computer program product or article of manufacture. As such, the terms "article of manufacture," "program storage device" and "computer program product" as used herein are intended to encompass a computer program accessible from any computer readable device or media.

The processing system 1700 may also be embodied in a desktop, laptop, tablet, notebook computer, personal data assistant (PDA), cellphone, smartphone, or any device with suitable processing and memory capability. Further, the processing system 1700 may utilize special purpose hardware to perform some or all of the foregoing functionality. For example, the encoding and decoding processes described above may be performed by a special purpose processor and associated memory.

Those skilled in the art will recognize many modifications may be made to this configuration without departing from the scope of the present disclosure. For example, those skilled in the art will recognize that any combination of the above components, or any number of different components, peripherals, and other devices, may be used. For example, particular functions described herein can be performed by hardware modules, or a processor executing instructions stored in the form of software or firmware. Further, the functionality described herein can be combined in single modules or expanded to be performed in multiple modules.

Conclusion

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of decoding a plurality of pictures, each picture processed at least in part according to a picture parameter set, the method comprising:
  (a) receiving a bitstream comprising the plurality of pictures and the picture parameter set;
  (b) parsing the picture parameter set to determine for a picture in the plurality of pictures whether a pps_extension_present_flag signaling flag specifies presence of a pps_extension syntax element at a picture level for the picture and a pps_extension syntax structure at said picture level for the picture, where said pps_extension syntax element includes a value of a plurality of bits;
  (c) wherein said pps_extension_present_flag equal to 1 specifies that said pps_extension syntax element is present in said picture parameter set;
  (d) wherein said pps_extension_present_flag equal to 0 specifies that said pps_extension syntax element is not present in said picture parameter set;
  (e) wherein the said pps_extension_present_flag, said pps_extension syntax structure, and said pps_extension syntax element, when present, are adaptable per picture in the plurality of pictures according to said picture parameter set;

(f) parsing said pps_extension syntax structure to determine if any pps_extension_data_flag syntax elements are present in the picture parameter set;
(g) wherein said parsing said pps_extension syntax structure further includes a syntax structure that includes a while(more_rbsp_data( )) structure;
(h) wherein said pps_extension syntax structure that includes said while(more_rbsp_data( )) structure further includes said pps_extension data flag;
(i) wherein, when said pps_extension syntax element is equal to 0 then no said pps_extension_data_flag is present in said while(more_rbsp_data( )) structure;
(j) wherein, when said pps_extension syntax element is equal to 1 then said pps_extension_data_flag is present in said while(more_rbsp_data( )) structure.

* * * * *